United States Patent
El-Hibri

(10) Patent No.: US 11,168,211 B2
(45) Date of Patent: Nov. 9, 2021

(54) HIGH-FLOW POLYETHERIMTDE COMPOSITIONS

(71) Applicant: SOLVAY SPECIALTY POLYMERS USA, LLC, Alpharetta, GA (US)

(72) Inventor: Mohammad Jamal El-Hibri, Atlanta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 16/096,590

(22) PCT Filed: Apr. 28, 2017

(86) PCT No.: PCT/EP2017/060213
§ 371 (c)(1),
(2) Date: Oct. 25, 2018

(87) PCT Pub. No.: WO2017/186921
PCT Pub. Date: Nov. 2, 2017

(65) Prior Publication Data
US 2019/0136055 A1    May 9, 2019

Related U.S. Application Data

(60) Provisional application No. 62/329,482, filed on Apr. 29, 2016, provisional application No. 62/456,964, filed on Feb. 9, 2017.

(30) Foreign Application Priority Data

Sep. 8, 2016   (EP) .................................. 16187796

(51) Int. Cl.
| | | |
|---|---|---|
| C08L 79/08 | (2006.01) |
| C08L 71/12 | (2006.01) |
| C08K 7/02 | (2006.01) |
| C08G 73/10 | (2006.01) |
| C08G 65/40 | (2006.01) |

(52) U.S. Cl.
CPC .............. C08L 79/08 (2013.01); C08G 65/40 (2013.01); C08G 65/4012 (2013.01); C08G 73/1053 (2013.01); C08G 73/1071 (2013.01); C08K 7/02 (2013.01); C08L 71/12 (2013.01); C08G 2650/40 (2013.01)

(58) Field of Classification Search
CPC .......... C08L 81/06; C08L 81/04; C08L 79/08; C08L 71/12; C08L 2205/035; C08L 2205/08; C08J 3/005; C08K 3/26; C08K 2003/262; C80K 3/26
See application file for complete search history.

(56) References Cited

U.S. PATENT DOCUMENTS

| | | | |
|---|---|---|---|
| 2010/0144955 A1* | 6/2010 | El-Hibri | C08G 75/23 524/514 |
| 2015/0251353 A1 | 9/2015 | Rodgers et al. | |

FOREIGN PATENT DOCUMENTS

| | | |
|---|---|---|
| CN | 1884330 A | 12/2006 |
| WO | 2015059216 A1 | 4/2015 |
| WO | 2015124903 A1 | 8/2015 |

OTHER PUBLICATIONS

Standard ASTM D1238-04, "Standard Test Method for Melt Flow Rates of Thermoplastics by Extrusion Plastometer", 2004, p. 1-13.
Standard ASTM D3763, "Test Method For High Speed Puncture Properties of Plastics using Load and Displacement Sensors", 2006, p. 1-9.

* cited by examiner

*Primary Examiner* — Shane Fang
(74) *Attorney, Agent, or Firm* — Beatrice C. Ortego

(57) ABSTRACT

A high-flow polymer composition includes a polyetherimide (PEI), a PEEK-PEDEK copolymer, and optionally a poly(aryletherketone) (PAEK) other than the PEEK-PEDEK copolymer. The polymer composition surprisingly exhibits improved toughness and chemical resistance, making it suitable for the manufacture of shaped articles where a combination of high-flow, impact resistance, and chemical resistance are required.

13 Claims, No Drawings

HIGH-FLOW POLYETHERIMTDE COMPOSITIONS

CROSS-REFERENCE TO RELATED APPLICATIONS

This application claims priority to U.S. Provisional Application No. 62/329,482, filed Apr. 29, 2016, to European Patent Application No. 16187796.4, filed Sep. 8, 2016, and to U.S. Provisional Application No. 62/456,964, filed Feb. 9, 2017, the whole content of each of these applications being incorporated herein by reference for all purposes.

FIELD OF THE INVENTION

The present invention relates to high-flow polymer compositions including a polyetherimide (PEI), a PEEK-PEDEK copolymer, and optionally a poly(aryletherketone) (PAEK) other than the PEEK-PEDEK copolymer, methods of making the polymer compositions, and shaped articles including the polymer compositions.

BACKGROUND

Polyetherimide (PEI) is a high performance polymer known for its heat, solvent, and flame resistance. PEI possesses good mechanical toughness and chemical resistance properties for many engineering applications; however, these benefits are not always possible to take advantage of because of its relatively high melt viscosity. This is especially the case in applications requiring very thin parts or layers, such as mobile electronics or wire coating. Another example is fused filament fabrication additive manufacturing, in which low melt viscosities are needed to allow polymer deposition without the need to use extremely high melt temperatures as the viscosity required for polymer deposition can be achieved at lower temperatures with the use of lower melt viscosity materials. High temperatures may degrade the polymer over time and generate charred material, which can plug the deposition nozzle of the additive manufacturing device or be introduced into the part being manufactured.

Accordingly, a need exists for high-flow PEI compositions that do not compromise PEI's desirable properties.

DETAILED DESCRIPTION OF PREFERRED EMBODIMENTS

Described herein are polymer compositions comprising a polyetherimide (PEI), a PEEK-PEDEK copolymer (as described below), and optionally a poly(aryl ether ketone) (PAEK) other than the PEEK-PEDEK copolymer, methods of making the polymer composition, and shaped articles including the polymer composition.

Applicants surprisingly discovered that blending PEEK-PEDEK copolymer with PEI produces a polymer composition exhibiting improved flowability, impact resistance, and in some cases, improved chemical resistance.

Traditionally, increasing PEI flowability is accomplished by reducing its molecular weight, which also results in a significant decrease in impact performance and chemical resistance. Applicants surprisingly found that the addition of a PEEK-PEDEK copolymer to PEI results in a polymer composition with increased its flowability relative to PEI alone, while also overcoming the aforementioned traditional limitations. Unlike the conventional method of reducing the molecular weight of the PEI, the present approach does not compromise, and in fact improves, the Dynatup impact resistance of the polymer compositions described herein. Moreover, Applicants surprisingly found that at least in some instances, the addition of even relatively small amounts of PEEK-PEDEK copolymer to the PEI resulted in a polymer compositions exhibiting greater chemical resistance than that of PEI or PEEK-PEDEK copolymer alone.

Flowability of the polymer composition can be determined by measuring the melt flow rate (MFR). In some embodiments, the polymer composition has an MFR ranging from about 40 to about 60 g/10 min, preferably from about 42 to about 59 g/10 min as measured at 400° C. with a 2.16 kg weight according to ASTM D1238. In some aspects, the melt flow rate of the polymer composition is at least 25%, preferably, at least 50% greater than the melt flow rate of the PEI alone (i.e. the PEI without the other components in the polymer composition), where the melt flow rate is measured at 365° C. with a 5.0 kg weight according to ASTM D1238. In alternative embodiments, the melt flow rate of the polymer composition can be as high as 150% greater than the melt flow rate of the PEI alone.

The toughness of the polymer composition can be determined by measuring the Izod and Dynatup impact resistance. The polymer composition may have a Dynatup impact resistance ranging from about 62 to about 72 ft-lb, as measured according to ASTM D3763. Moreover, the polymer composition may have a Dynatup deflection at maximum load ranging from about 0.75 to about 0.85 inches as measured according to ASTM D3763. In some embodiments, the polymer composition may have a notched Izod impact resistance determined per ASTM D256 ranging from 0.80 to 2.25 ft-lb/in, preferably from 0.85 to 2.0 ft-lb/in.

Chemical resistance of a plastic to polar organic chemicals can be measured by its resistance to sunscreen lotion, which generally represents one of the harshest consumer chemicals. In particular, sunscreen lotion generally contains a spectrum of ultraviolet absorbing chemicals that can be highly corrosive to plastic. A representative sunscreen can include at least 1.8 wt. % avobenzone (1 (4-methoxyphenyl)-3-(4-tert-butylphenyl)-1,3-propanedione), at least 7 wt. % homosalate (3,3,5-trimethylcyclohexyl salicylate) and at least 5 wt. % octocrylene (2-ethylhexyl 2-cyano-3,3-diphenylacrylate). An example of the aforementioned sunscreen is commercially available under the trade name Banana Boat® Sport Performance® (SPF 30) from Edgewell (St. Louis, Mo.).

The chemical resistance of a polymer composition to chemicals such as sunscreen can be measured using environmental stress cracking resistance (ESCR) testing. ESCR is assessed by measuring the lowest strain necessary to visually observe cracking or crazing in a molded sample of the polymer composition after the sample is exposed to aggressive chemicals and aged in a controlled environment ("critical strain"). In general, the higher the critical strain, the higher the chemical resistance of the polymer composition. In some embodiments, the polymer composition has an ESCR critical strain to sunscreen of ≥1.0%, preferably ≥1.5%. The measurement of critical strain is described further in the Examples below.

The polymer composition preferably has a glass transition temperature (Tg) ranging from about 160° C. to about 210° C., preferably from about 165° C. to about 200° C., most preferably from about 169° C. to about 200° C., where the Tg is the midpoint Tg determined on the second heat scan by differential scanning calorimetry (DSC) according to ASTM D3418 using a 20.00° C./min heating rate.

In some embodiments, the polymer composition has a heat deflection temperature determined per ASTM D648 ranging from about 145° C. to about 185° C., preferably from about 150° C. to about 180° C.

The above properties make the flow-enhanced PEI formulations suitable for use in applications that require a combination of toughness and chemical resistance along with high flowability. Examples of such applications include injection molding of thin walled articles (e.g., articles having a portion with a thickness less than 2.0 mm, preferably less than 1.5 mm and an overall average flow length to thickness ratio of greater than 50, preferably greater than 100, and more preferably greater than 150) parts for aircraft interiors, dishware and food processing components, fibers for woven and non-woven fabrics, thermoformable laminated sheets, and shaped articles made by additive manufacturing such as by fused filament fabrication.

Polyetherimide (PEI)

As used herein, a polyetherimide (PEI) denotes any polymer of which more than 50 mol % of recurring units ($R_{PEI}$) are selected from the group consisting of units of formulae:

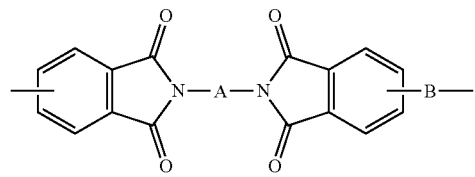

(A)

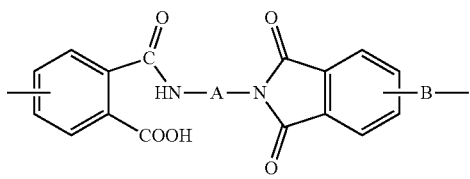

(A-1)

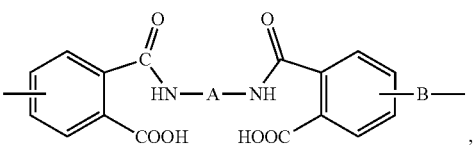

(A-2)

and combinations thereof, where:

each B, equal to or different from each other, is independently selected from group consisting of —O— and —O—Ar—O—, where Ar is selected from the group consisting of moieties of formulae:

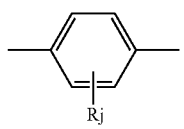

(B)

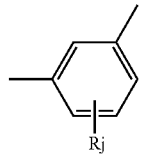

(B-1)

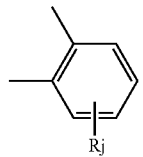

(B-2)

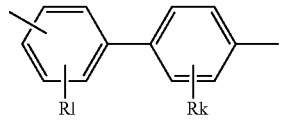

(B-3)

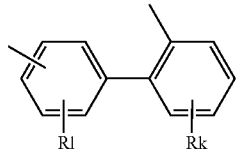

(B-4)

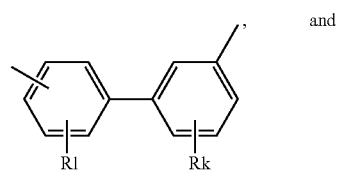

and (B-5)

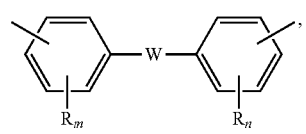

(B-6)

where each R, equal or different from each other, is independently selected from the group consisting of hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium; each j, k, l, m and n, equal to or different from each other, is independently selected from 0, 1, 2, 3 and 4, preferably 0; and W is selected from the group consisting of alkylenes having 1 to 6 carbon atoms, in particular —C(CH$_3$)$_2$— and —C$_r$H$_{2r}$— (r being an integer ranging from 1 to 6); perfluoroalkylenes having 1 to 6 carbon atoms, in particular —C(CF$_3$)$_2$— and —C$_s$F$_{2s}$— (s being an integer ranging from 1 to 6); cycloalkylenes having 4 to 8 carbon atoms; alkylidenes having 1 to 6 carbon atoms; cycloalkylidenes having 4 to 8 carbon atoms; —O—; —S—; —C(O)—; —SO$_2$—; and —SO—.

Preferably, B is a group of the formula (B-6), as shown above. More preferably, B is a group of formula:

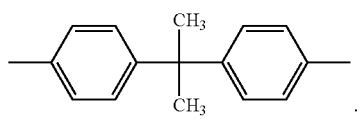
(B-7)

each A, equal to or different from each other, is selected from the group, —C$_t$H$_{2t}$— (t being an integer ranging from 1 to 6), and moieties of formulae:

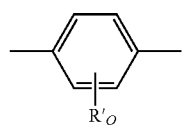
(C)

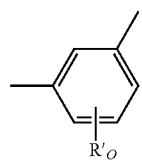
(C-1)

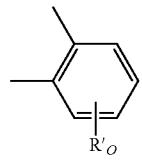
(C-2)

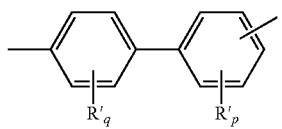
(C-3)

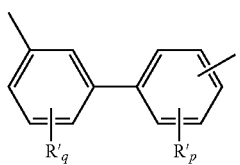
(C-4)

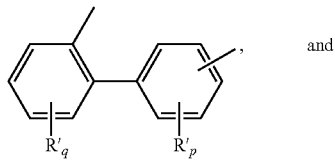
(C-5)

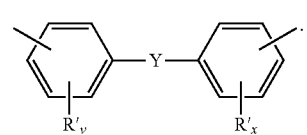
(C-6)

where each R', equal to or different from each other, is independently selected from the group consisting of hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium; o, p, q, v, and x, equal to or different from each other, is independently selected from 0, 1, 2, 3 and 4, preferably 0; and Y is selected from the group consisting of alkylenes having 1 to 6 carbon atoms, in particular —C(CH$_3$)$_2$— and —C$_u$H$_{2u}$— (u being an integer from 1 to 6); perfluoroalkylenes having 1 to 6 carbon atoms, in particular —C(CF$_3$)$_2$— and —C$_w$F$_{2w}$— (w being an integer from 1 to 6); cycloalkylenes having 4 to 8 carbon atoms; alkylidenes having 1 to 6 carbon atoms; cycloalkylidenes having 4 to 8 carbon atoms; —O—; —S—; —C(O)—; —SO$_2$—; and —SO—.

Preferably, A is selected from the group consisting of moieties of formulae (C) to (C-2), as shown above. More preferably, A is selected from the group consisting of unsubstituted m-phenylene, unsubstituted p-phenylene, and a combination thereof.

In some embodiments, A is a group of formula:

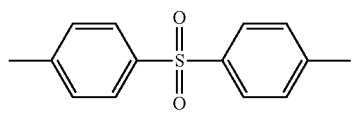
(C-7)

In some embodiments, the recurring units (R$_{PEI}$) are recurring units selected from the group consisting of those of formulae:

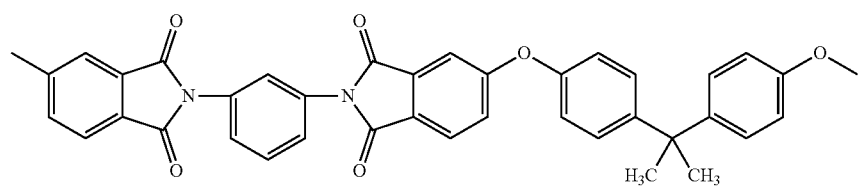
(D)

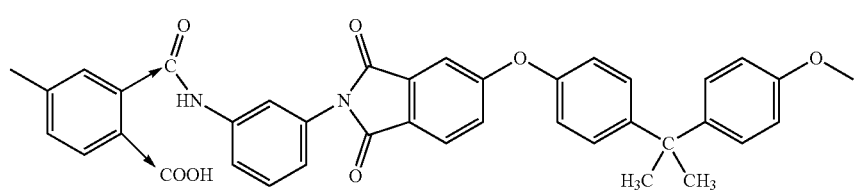
(D-1)

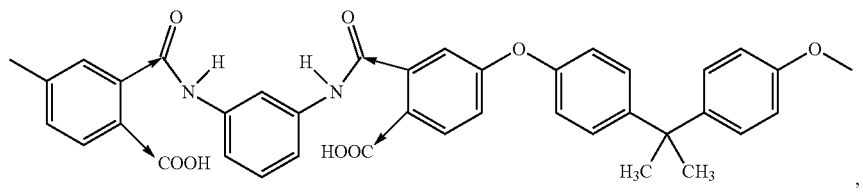

and combinations thereof,
where in formulae (D-1) and (D-2) the arrows "→" denote isomerism, such that in any recurring unit, the groups to which the arrows point from the same aromatic ring may exist as shown or be interchanged with respect to each other on that aromatic ring.

In some embodiments, the recurring units ($R_{PEI}$) are recurring units selected from the group consisting of those of formulae:

The PEI may have a weight average molecular weight (Mw) ranging from about 10,000 to about 150,000 g/mole, as measured by gel permeation chromatography using a polystyrene standard.

The polymer composition may include the PEI in an amount ranging from about 40 to about 99 wt. %, preferably from about 50 to about 75 wt. %, based on the combined weight of the PEEK-PEDEK copolymer and the polyetherimide (PEI).

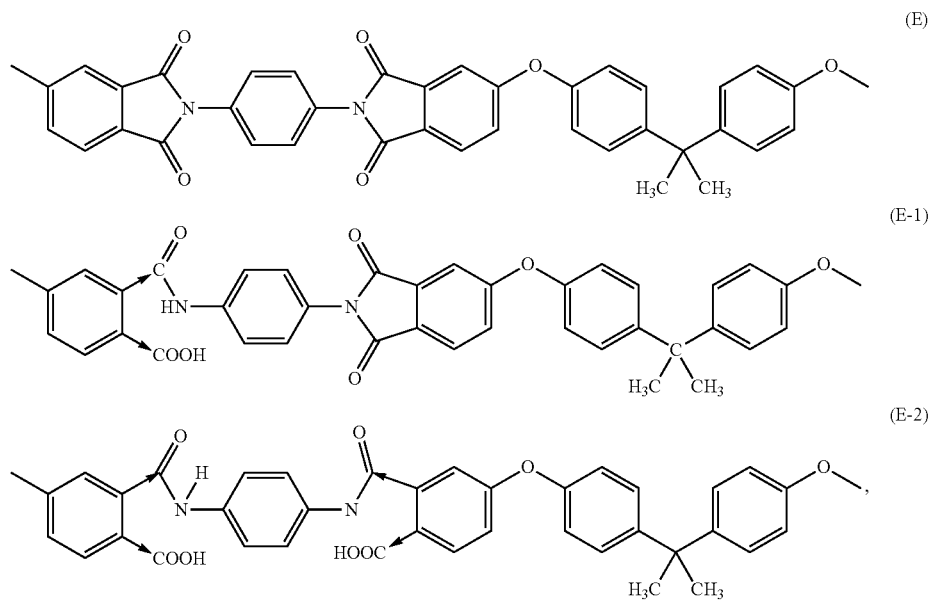

and combinations thereof,
where in formulae (E-1) and (E-2) the arrows "→" denote isomerism, such that in any recurring unit, the groups to which the arrows point from the same aromatic ring may exist as shown or be interchanged with respect to each other on that aromatic ring.

Preferably at least 75 mol %, 85 mol %, 95 mol %, and more preferably at least 99 mol % of the recurring units of the PEI are recurring units ($R_{PEI}$).

In some embodiments, at least 75 mol %, 85 mol %, 95 mol %, and more preferably at least 99 mol % of the recurring units ($R_{PEI}$) are units of formula (D), their corresponding amic acid forms of formulae (D-1) and (D-2), and combinations thereof.

In some embodiments, at least 75 mol %, 85 mol %, 95 mol %, and more preferably at least 99 mol % of the recurring units ($R_{PEI}$) are units of formula (E), their corresponding amic acid forms of formulae (E-1) and (E-2), and combinations thereof.

In some embodiments, the PEI is a copolymer including:
1) at least 40 mol %, preferably at least 50%, of first recurring units ($R_{PEI-1}$) selected from the group consisting of units of formulae (D), (D-1), (D-2), (E), (E-1), (E-2), as shown above, and combinations thereof; and
2) at most 60 mol %, preferably at most 50%, of second recurring units ($R_{PEI-2}$) selected from the group consisting of units of formulae (A), (A-1), and (A-2), shown above, where A is selected from the group consisting of moieties of formulae (C), (C-1), (C-2), and (C-7), shown above, and B is selected from the group consisting of —O—, and moieties of formula —O—Ar—O—, where Ar is selected from the group consisting of moieties of formulae (B) and (B-3), shown above.

In alternative embodiments, the PEI is a copolymer including:
1) at least 40 mol %, preferably at least 50%, of first recurring units ($R_{PEI-1}$) selected from the group consisting of units of formulae (D), (D-1), (D-2), (E), (E-1), (E-2), as shown above, and combinations thereof; and 2) at most 60 mol %, preferably at most 50%, of third recurring units ($R_{PEI-3}$) of formula:

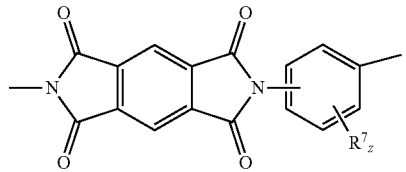

where each $R^7$, equal or different from each other, is independently selected from the group consisting of hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium; and each z, equal to or different from each other, is independently selected from 0, 1, 2, 3 and 4, preferably zero.

In some embodiments, the polymer composition includes only one PEI polymer. In alternative embodiments, the polymer composition may include two, three, four, or more PEI.

For example, the polymer composition may include a blend of the following two polymers:

1) a first PEI including at least 50 mol %, at least 75 mol %, 85 mol %, 95 mol %, and more preferably at least 99 mol % of recurring units ($R_{PEI}$) selected from the group consisting of units of formulae (D), (D-1), (D-2), (E), (E-1), (E-2), as shown above, and combinations thereof; and 2) a second PEI including at least 50 mol %, at least 75 mol %, 85 mol %, 95 mol %, and more preferably at least 99 mol % of recurring units ($R_{PEI}$) selected from the group consisting of units of formulae (A), (A-1), and (A-2), shown above, where A is selected from the group consisting of moieties of formulae (C), (C-1), (C-2), and (C-7), shown above, and B is selected from the group consisting of —O—, and moieties of formula —O—Ar—O—, where Ar is selected from the group consisting of moieties of formulae (B) and (B-3), shown above.

In some embodiments, the weight ratio of the first PEI to the second PEI ranges from 40/60 to 95/5.

PEEK-PEDEK Copolymer

As used herein, a "PEEK-PEDEK copolymer" denotes a copolymer comprising:
recurring units ($R_{PEEK}$) of formula (F):

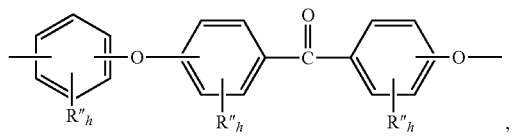

and
recurring units ($R_{PEDEK}$) of formula (G):

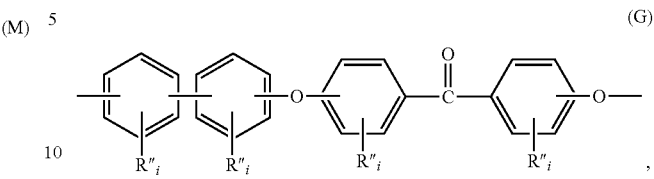

where:
each R", equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
each h, equal to or different from each other, is an integer ranging from 0 to 4; and
each i, equal to or different from each other, is an integer ranging from 0 to 4.

In some embodiments, recurring units ($P_{PEEK}$) are selected from units of formula:

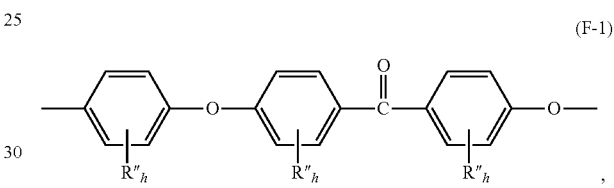

and recurring units ($R_{PEDEK}$) are selected from units of formula:

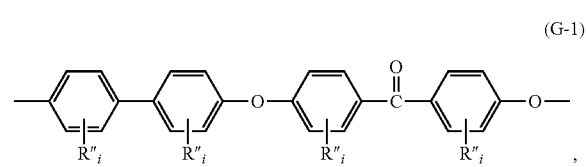

where R", h and i are as described above.

Preferably each h is zero, preferably each i is zero, and most preferably, each of h and i are zero such that the PEEK-PEDEK copolymer comprises:
recurring units ($R_{PEEK}$) of formula:

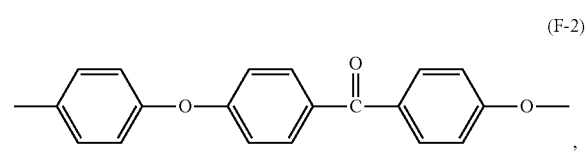

and
recurring units ($R_{PEDEK}$) of formula:

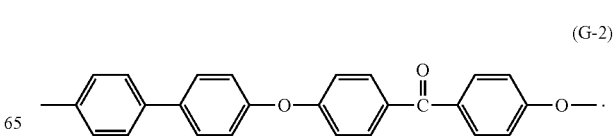

Recurring units ($R_{PEEK}$) and ($R_{PEDEK}$) collectively represent at least 50 mol %, preferably at least 60 mol %, 70 mol %, 80 mol %, 90 mol %, 95 mol %, and most preferably at least 99 mol % of recurring units in the PEEK-PEDEK copolymer.

Recurring units ($R_{PEEK}$) and ($R_{PEDEK}$) are present in the PEEK-PEDEK copolymer in a molar ratio ($R_{PEEK}$)/($R_{PEDEK}$) ranging from 90/10 to 65/40, preferably from 80/20 to 70/30. Most preferably, the molar ratio ($R_{PEEK}$)/($R_{PEDEK}$) is 80/20.

The weight-average molecular weight, Mw, of the PEEK-PEDEK copolymer preferably ranges from 50,000 to 110,000 Daltons, more preferably from 60,000 to 100,000 Daltons and most preferably from 70,000 to 90,000 Daltons as measured by gel permeation chromatography (GPC) using polystyrene calibration standards. Preferably, the PEEK-PEDEK copolymer exhibits a melt viscosity of at least 30 Pa-s, preferably at least 50 Pa-s, more preferably at least 80 Pa-s, as measured according to ASTM D3835 at 400° C. and 1000 s-1 using a tungsten carbide die of 0.5×3.175 mm.

The polymer composition includes the PEEK-PEDEK copolymer in an amount ranging from about 1 to about 60 wt. %, preferably from about 25 to about 50 wt. %, more preferably from about 25 to about 40 wt %, based on the combined weight of the PEEK-PEDEK copolymer and the polyetherimide (PEI).

Optional Poly(Aryl Ether Ketone) (PAEK)

The polymer composition may optionally further comprise a poly(aryl ether ketone) (PAEK) different from the PEEK-PEDEK copolymer.

As used herein, a "poly(aryl ether ketone) (PAEK)" denotes any polymer comprising more than 50 mol % of recurring units ($R_{PAEK}$) selected from the group consisting of units of formulae:

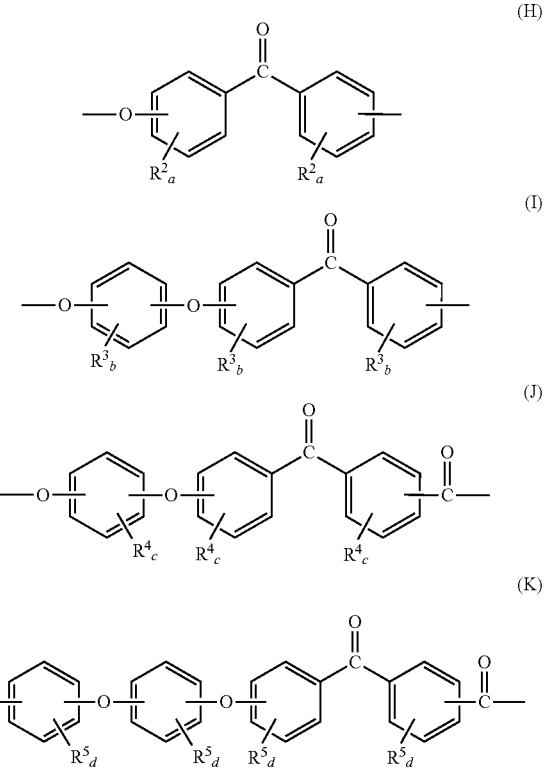

(H)

(I)

(J)

(K)

(L)

where each of $R^2$, $R^3$, $R^4$, $R^5$, and $R^6$, equal or different from each other, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and each of a, b, c, d, and e, equal to or different from each other, is independently selected from 0, 1, 2, 3, and 4. Preferably, each of a, b, c, d, and e is 0.

Preferably, the phenylene moieties in recurring units ($R_{PAES}$) have 1,3- or 1,4-linkages.

Preferably at least 60 mol %, 70 mol %, 80 mol %, 90 mol %, 95 mol %, 99 mol % of recurring units ($R_{PAES}$) are selected from the group consisting of recurring units of formulae (H), (I), (J), (K), and (L).

In some embodiments, the PAEK is poly(ether ketone) (PEK). As used herein, a "poly(ether ketone) (PEK)" denotes any polymer of which more than 50 mol % of the recurring units ($R_{PAEK}$) are recurring units of formula:

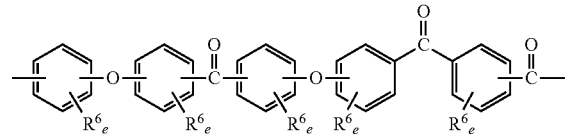

(H-1)

where $R^{2'}$ and a', at each instance, is independently selected from the groups described above for $R^2$ and a, respectively. Preferably each a' in formulae (H-1) is zero.

Preferably at least 60 mol %, 70 mol %, 80 mol %, 90 mol %, 95 mol %, 99 mol % of recurring units ($R_{PAEK}$) are recurring units of formula (H-1).

In some embodiments, the PAEK is poly(ether ether ketone) (PEEK). As used herein, a "poly(ether ether ketone) (PEEK)" denotes any polymer of which more than 50 mol % of the recurring units ($R_{PAEK}$) are recurring units of formula:

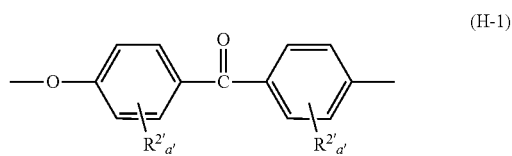

(I-1)

where $R^{3'}$ and b', at each instance, is independently selected from the groups described above for $R^3$ and b, respectively. Preferably each b' in formulae (I-1) is zero.

Preferably at least 60 mol %, 70 mol %, 80 mol %, 90 mol %, 95 mol %, 99 mol % of recurring units ($R_{PAEK}$) are recurring units of formula (I-1).

In some embodiments, the PAEK is poly(ether ketone ketone) (PEKK). As used herein, a "poly(ether ketone ketone) (PEKK)" denotes any polymer of which more than 50 mol % of the recurring units ($R_{PAEK}$) are a combination of recurring units of formulas (J-1) and (J-2):

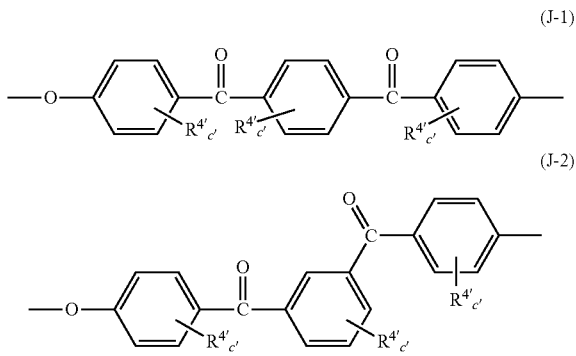

where $R^{4'}$ and c', at each instance, are independently selected from the groups described above for $R^4$ and c, respectively. Preferably each c' in formulae (J-1) and (J-2) is zero.

Preferably at least 60 mol %, 70 mol %, 80 mol %, 90 mol %, 95 mol %, 99 mol % of recurring units ($R_{PAEK}$) are a combination of recurring units (J-1) and (J-2).

In some embodiments, the mol ratio of units (J-1):(J-2) ranges from 50:50 to 85:15, preferably from 55:45 to 80:20, more preferably from 65:35 to 75:25.

In some embodiments, the PAEK is poly(ether ether ketone ketone) (PEEKK). As used herein, a "poly(ether ether ketone ketone) (PEEKK)" denotes any polymer of which more than 50 mol % of the recurring units ($R_{PAEK}$) are recurring units of formula:

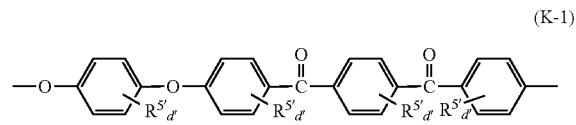

where $R^{5'}$ and d', at each instance, are independently selected from the groups described above for $R^5$ and d, respectively. Preferably each d' in formulae (K-1) is zero.

Preferably at least 60 mol %, 70 mol %, 80 mol %, 90 mol %, 95 mol %, 99 mol % of recurring units ($R_{PAEK}$) are recurring units of formula (K-1).

In some embodiments, the PAEK is poly(ether ketone ether ketone ketone) (PEKEKK). As used herein, a "poly (ether ketone ether ketone ketone) (PEKEKK)" denotes any polymer of which more than 50 mol % of the recurring units ($R_{PAEK}$) are recurring unit of formula:

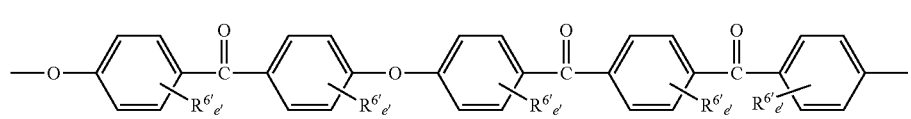

where $R^{6'}$ and e', at each instance, are independently selected from the groups described above for $R^6$ and e, respectively. Preferably, each e' in formulae (L-1) is zero.

Preferably, at least 60 mol %, 70 mol %, 80 mol %, 90 mol %, 95 mol %, 99 mol % of recurring units ($R_{PAEK}$) are recurring units of formula (L-1).

The PAEK is preferably PEK, PEEK, PEKK, PEKEKK, or PEDEKK, most preferably PEEK.

The amount of the optional PAEK in the polymer composition ranges from 0 to about 25 wt. %, preferably from 5 to 20 wt. % based on the total weight of the polymer composition.

Optional Reinforcing Fillers

The polymer composition may optionally include reinforcing fillers such as fibrous or particulate fillers. A fibrous reinforcing filler is a material having length, width and thickness, wherein the average length is significantly larger than both the width and thickness. Preferably, such a material has an aspect ratio, defined as the average ratio between the length and the smallest of the width and thickness of at least 5. Preferably, the aspect ratio of the reinforcing fibers is at least 10, more preferably at least 20, still more preferably at least 50. The particulate fillers have an aspect ratio of at most 5, preferably at most 2.

Preferably, the reinforcing filler is selected from mineral fillers, such as talc, mica, kaolin, calcium carbonate, calcium silicate, magnesium carbonate; glass fibers; carbon fibers, boron carbide fibers; wollastonite; silicon carbide fibers; boron fibers, graphene, carbon nanotubes (CNT), and the like. Most preferably, the reinforcing filler is glass fiber, preferably chopped glass fiber.

The amount of the reinforcing filler may range in the case of particulate fillers, from 1 wt. % to 40 wt. %, preferably from 5 wt. % to 35 wt. % and most preferably from 10 wt. % to 30 wt. %, and in the case of fibrous fillers from 5 wt. % to 50 wt. %, preferably from 10 wt. % to 40 wt. %, and most preferably from 15 wt. % to 30 wt. % based on the total weight of the polymer composition. In some embodiments, the polymer composition is free of a fibrous filler. Alternatively the polymer composition may be free of a particulate filler. Preferably, the polymer composition is free of reinforcing fillers.

Optional Additives

In addition to the PEI, the PEEK-PEDEK copolymer, the optional PAEK, and the optional reinforcing filler, the polymer composition may further include optional additives such as titanium dioxide, zinc sulfide, zinc oxide, ultraviolet light stabilizers, heat stabilizers, antioxidants such as organic phosphites and phosphonites, acid scavengers, processing aids, nucleating agents, lubricants, flame retardants, a smoke-suppressing agents, anti-static agents, anti-blocking agents, and conductivity additives such as carbon black.

When one or more optional additives are present, their total concentration is preferably less than 10 wt. %, more preferably less than 5 wt. %, and most preferably less than 2 wt. %, based on the total weight of polymer composition.

Method of Making the Polymer Composition

Exemplary embodiments include a method of making the polymer composition described herein by melt mixing the PEI, the PEEK-PEDEK copolymer, the optional PAEK, the optional reinforcing filler, and the optional additives.

The polymer composition can be prepared by any known melt-mixing process that is suitable for preparing thermoplastic molding compositions. Such a process may be carried out by heating the polymers above their melting temperatures to form a melt mixture of the polymers. In the some aspects, the components for forming the polymer composition are fed, simultaneously or separately, to the melt-mixing apparatus and melt-mixed in the apparatus. Suitable melt-mixing apparatuses are, for example, kneaders, Banbury mixers, single-screw extruders, and twin-screw extruders.

Shaped Articles Including the Polymer Composition

Exemplary embodiments also include shaped articles comprising the above-described polymer composition.

The shaped articles may be made from the polymer composition using any suitable melt-processing method such as injection molding, extrusion molding, roto-molding, or blow-molding.

As discussed above, the polymer composition may be well suited for the manufacture of articles useful in a wide variety of applications. For example, the high-flow, toughness, and chemical resistance properties of the polymer composition makes it especially suitable for use in thin walled articles, parts for aircraft interiors, dishware and food processing components, fibers for woven and non-woven fabrics, thermoformable laminated sheets, and shaped articles made by additive manufacturing such as by fused filament fabrication.

Should the disclosure of any patents, patent applications, and publications which are incorporated herein by reference conflict with the description of the present application to the extent that it may render a term unclear, the present description shall take precedence.

Exemplary embodiments will now be described in the following non-limiting examples.

EXAMPLES

The effects of adding a PEEK-PEDEK copolymer to a PEI polymer composition were evaluated. Table 1 below shows the compositions and test results for three working examples (Examples 1, 2, and 3). For comparison, standard flow PEI (Comparative Example 1), PEEK-PEDEK copolymer (Comparative Example 2), and high flow PEI (Comparative Example 3) were also evaluated.

Materials

Ultem® PEI grade 1000 natural resin available from SABIC Innovative Plastics. This is a standard viscosity grade of PEI for general purpose extrusion and injection molding applications. It has a nominal melt flow rate of 9 g/10 min as measured using a melt index apparatus according to ASTM D1238 at 337° C. and using a 6.6 kg weight.

Ultem® PEI grade 1010 natural resin also available from Sabic Innovative Plastics. This is a low viscosity grade of PEI intended for injection molding applications that require high flowability. It has a nominal melt flow rate of 17.8 g/10 min as measured using a melt index apparatus according to ASTM D1238 at 337° C. and using a 6.6 kg weight.

The copolymer used in the examples was a poly(ether ether ketone) (PEEK) copolymer where the stoichiometric amount of hydroquinone was partially substituted with biphenol (4,4'-dihydroxydiphenyl). Such copolymers are also known as "PEEK-PEDEK copolymers" where "PEDEK" represents the polymer repeating unit from the polycondensation of biphenol with 4,4'-difluorobenzophenone.

The PEEK-PEDEK copolymer used in the examples was 80/20 PEEK-PEDEK copolymer (80 mol % PEEK, 20 mol % PEDEK).

Preparation of Formulations

The compositions of the Examples and Comparative Examples are shown below in Table 1. All polymer blends were prepared by first tumble blending pellets of the resins to be blended in their respective amounts for about 20 minutes, followed by melt compounding. The compositions of Examples were miscible (i.e. exhibited a single glass transition temperature Tg) and transparent.

Testing of the Formulations

Mechanical properties were tested for all the formulations using injection molded 0.125 in (3.2 mm) thick ASTM test specimens which consisted of 1) Type I tensile bars, 2) 5 in ×0.5 in ×0.125 in flexural bars, and 3) 4 in×4 in×0.125 in plaques for the instrumented impact (Dynatup) testing. The following ASTM test methods were employed in evaluating all compositions:

D638: Tensile properties
D790: Flexural properties
D256: Izod impact resistance (notched)
D4812: Izod impact resistance (unnotched)
D3763: Instrumented impact resistance also known by the name Dynatup impact
D648: Heat deflection temperature
D3418: Glass transition by differential scanning calorimetry (20° C./min heating rate)

Melt rheology and melt processability were evaluated by melt flow rate measurement according to ASTM D1238 at 400° C. with a 2.16 kg weight.

Chemical resistance against sunscreen cream was tested by applying Banana Boat® SPF30 broad spectrum sunscreen cream to ASTM D-246C (5 in.×0.5 in.×0.125 in.) flexural bars that were mounted onto a Bergen parabolic variable strain flexural jig, which varied the applied strain on the plastic material from about zero to about 2.0%, to form stressed assemblies. As used herein, x % applied strain is the strain required to elongate the molded sample of the polymer composition by x %. For example, if the length of the molded sample was 1 in., 2% applied strain refers to the strain required to elongate the molded sample to 1.02 in. in the direction of the applied strain. The stressed assemblies were aged in a controlled humidity environmental chamber at a temperature of about 65° C. and relative humidity of about 90% for 24 hours. Subsequently, the assemblies were removed from the chamber and the ASTM flexural bars mounted on the strain jigs were inspected for any signs of cracking or crazing. Critical strain to failure was recorded as the lowest strain level on the parabolic fixture on which cracking or crazing was observed.

The effects of PEEK-PEDEK copolymer addition on the mechanical, chemical resistance, and flow properties of PEI are shown below in Table 1.

TABLE 1

Mechanical, Thermal, Flow, and Chemical Resistance Properties of Exemplary Formulations

| | C1 | E1 | E2 | E3 | C2 | C3 |
|---|---|---|---|---|---|---|
| Ultem® 1000 PEI | 100 | 75 | 60 | 50 | — | — |
| 80-20 PEEK-PEDEK Copolymer | — | 25 | 40 | 50 | 100 | — |
| Ultem® 1010 PEI | — | — | — | — | — | 100 |
| Tests | | | | | | |
| Tensile Yield Strength (psi) | 16500 | 15000 | 13400 | 11700 | 10200 | 16600 |
| Tensile Modulus (Ksi) | 488 | 460 | 431 | 411 | 398 | 498 |
| Tensile Yield Elongation (%) | 7.0 | 6.9 | 6.6 | 6.1 | 5.4 | 7.0 |
| Tensile Elongation at Break (%) | 32 | 48 | 67 | 92 | 250 | 26 |
| Flexural Strength (psi) | 20800 | 19400 | 18200 | 16700 | 15400 | 21400 |
| Flexural Modulus (Ksi) | 488 | 458 | 434 | 411 | 403 | 504 |
| Notched Izod (ft-lb/in) | 0.78 | 0.89 | 1.32 | 1.99 | 31.4 | 0.63 |
| Unnotched Izod (ft-lb) | 31.6 | 53.9 | No Break | No Break | No Break | 29.7 |
| Dynatup Impact - Total Energy (ft-lb) | 18.9 | 67.5 | 63.2 | 71.2 | 60.8 | 10.7 |
| Dynatup Impact - Deflection at Maximum Load (in) | 0.38 | 0.80 | 0.76 | 0.84 | 0.81 | 0.28 |
| Heat Deflection Temperature (° C.) | 196 | 180 | 166 | 150 | 143 | 195 |
| Tg, by DSC (° C.) | 219.7 | 199.7 | 181.9 | 169.1 | 153.6 | 217.1 |
| ESCR - Critical Strain in Sunscreen (%) | 1.0 | N.E.* | 1.5 | 1.0 | 1.2 | — |
| Melt Flow Rate at 400° C., 2.16 kg (g/10 min) | 23.8 | 42.3 | 56.8 | 58.6 | 73.3 | 49.7 |

*NE = No effect up to maximum applied strain of 2.0%

As shown above, there was a significant improvement in melt flow with the addition of even a minor amount of PEEK-PEDEK copolymer. The melt flow of the PEI compositions modified with PEEK-PEDEK exhibited substantially enhanced flow relative to unmodified standard flow PEI (Comparative Example 1), and the magnitude of improvement was on the same order as the melt flow rate achieved by the lower molecular weight PEI grade, Ultem® 1010 natural resin (Comparative Example 3).

Moreover, the flow enhancement was not achieved at the expense of a reduction in toughness as is usually the case in the well-known trade-off between polymer mechanical toughness and melt flow characteristics. The Dynatup impact resistance of the polymer compositions (Examples 1 to 3) was surprisingly found to be significantly greater than both the standard flow PEI alone (Comparative Example 1) and the PEEK-PEDEK copolymer alone (Comparative Example 2). In addition, the Dynatup deflection at maximum load of the polymer compositions (Examples 1 to 3) was unexpectedly found to be equivalent to the Dynatup deflection at maximum load of the PEEK-PEDEK copolymer alone (Comparative Example 2)—even at a loading of only 25% of the PEEK-PEDEK copolymer (Example 1). These findings are in contrast to the dramatic reduction in both Dynatup impact parameters for the lower molecular weight PEI (Comparative Example 3).

Finally, the environmental stress cracking resistance (ESCR) critical strain to sunscreen of Examples 1 and 2 was surprisingly found to be significantly greater than that of both the standard flow PEI alone (Comparative Example 1) and the PEEK-PEDEK copolymer alone (Comparative Example 2).

The invention claimed is:

1. A polymer composition comprising:
(i) a polyetherimide (PEI) comprising at least 50 mol. % of recurring units ($R_{PEI}$) selected from the group consisting of formulae:

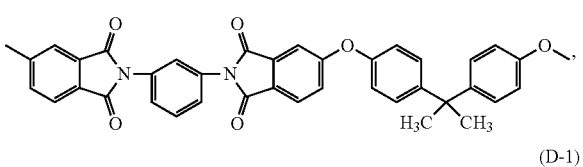

(D)

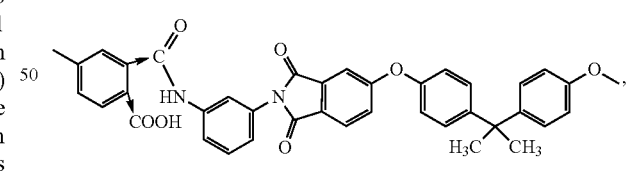

(D-1)

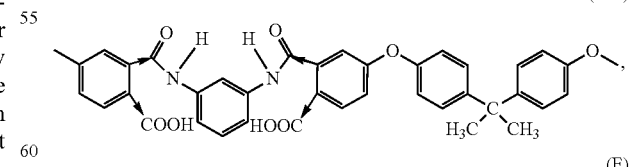

(D-2)

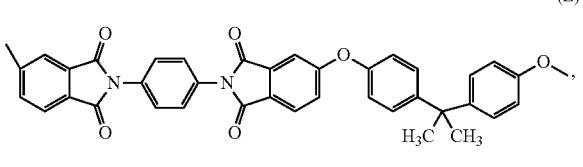

(E)

-continued

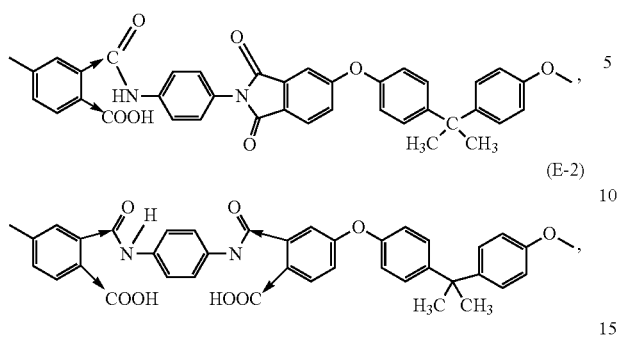

and combinations thereof, wherein in formulae (D-1), (D-2), (E1), and (E2), the arrows "→" denote isomerism, such that in any recurring unit, the groups to which the arrows point from the same aromatic ring exist as shown or interchanged with respect to each other on said aromatic ring;

(ii) a PEEK-PEDEK copolymer comprising:
recurring units ($R_{PEEK}$) of formula:

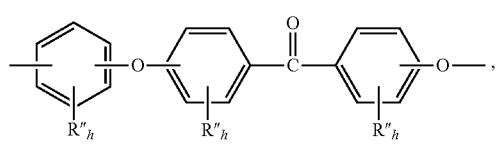

and
recurring units ($R_{PEDEK}$) of formula:

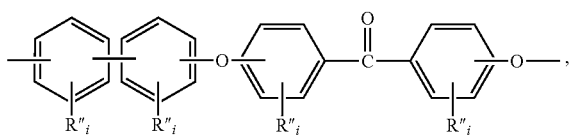

wherein:
each R″, equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium, each h, equal to or different from each other, is an integer ranging from 0 to 4, each i, equal to or different from each other, is an integer ranging from 0 to 4; and the total concentration of recurring units ($R_{PEEK}$) and ($R_{PEDEK}$) is at least 50 mol. %, relative to the total number of moles of recurring units in the PEEK-PEDEK copolymer; and (iii) optionally a poly(aryl ether ketone)(PAEK) comprising more than 50 mol. % of recurring units ($R_{PAEK}$) selected from the group consisting of units of formulae:

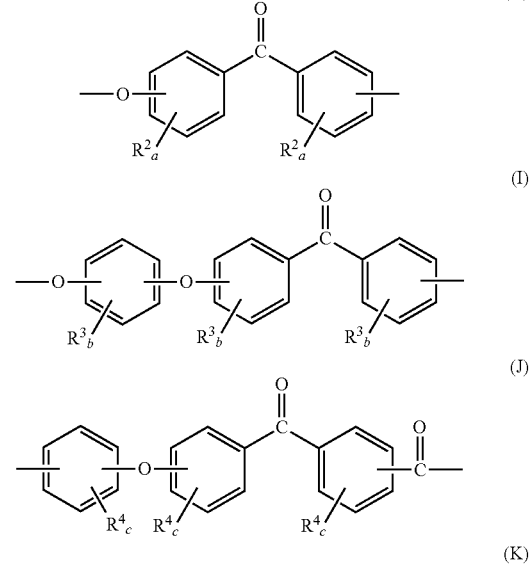

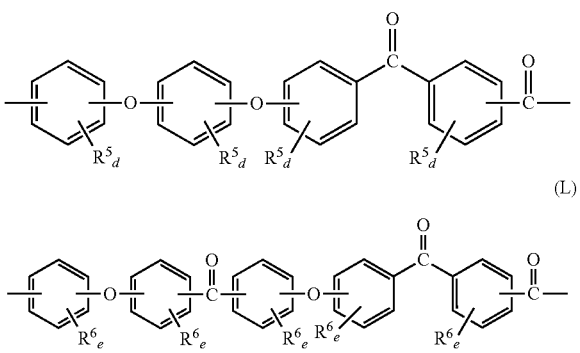

wherein:
each of $R^2$, $R^3$, $R^4$, $R^5$, and $R^6$, equal or different from each other, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium; and each of a, b, c, d, and e, equal to or different from each other, is independently selected from 0, 1, 2, 3, and 4, and wherein the polyetherimide (PEI) is in an amount ranging from about 75 to about 50 wt. %, based on the combined weight of the PEEK-PEDEK copolymer and the polyetherimide (PEI).

2. The polymer composition of claim 1, wherein the PEEK-PEDEK copolymer comprises:
recurring units ($R_{PEEK}$) of formula (F-2):

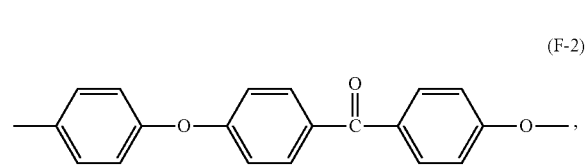

and recurring units ($R_{PEDEK}$) of formula (G-2):

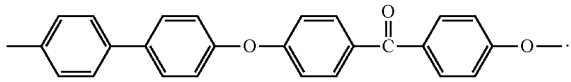 (G-2)

3. The polymer composition of claim 1, wherein the polymer composition includes the PEEK-PEDEK copolymer in an amount ranging from about 25 to about 40 wt. %, based on the combined weight of the PEEK-PEDEK copolymer and the polyetherimide (PEI).

4. The polymer composition of claim 1, wherein the molar ratio of recurring units ($R_{PEEK}$)/($R_{PEDEK}$) ranges from 90/10 to 65/35.

5. The polymer composition claim 1, wherein the melt flow rate of the polymer composition is at least 25% greater than the melt flow rate of the PEI alone, wherein the melt flow rate is measured at 400° C. with a 2.16 kg weight according to ASTM D1238.

6. The polymer composition of claim 1, wherein the polymer composition has a Dynatup impact resistance ranging from about 62 to about 72 ft-lb, as measured according to ASTM D3763.

7. The polymer composition of claim 1, wherein the polymer composition has an environmental stress cracking resistance critical strain to sunscreen of ≥1.0%,
wherein the environmental stress cracking resistance is measured as the critical strain of an ASTM D-246C 5 in×0.5 in×0.125 in flexural bar molded from the polymer composition after coating the flexural bar with sunscreen cream and applying a relative strain of 2% to the coated flexural bar for 24 hours at 65° C. and a relative humidity of 90%, and
wherein the sunscreen comprises at least 1.8 wt. % avobenzone, at least 7 wt. % homosalate and at least 5 wt. % octocrylene.

8. The polymer composition of claim 1, further comprising a reinforcing filler.

9. The polymer composition of claim 8, wherein the reinforcing filler is a fibrous filler, and the polymer composition includes the fibrous filler in an amount ranging from 5 wt. % to 50 wt. %, based on the total weight of the polymer composition.

10. A method of making the polymer composition of claim 1, comprising melt mixing the polyetherimide (PEI) and the PEEK-PEDEK copolymer.

11. A shaped article comprising the polymer composition of claim 1.

12. The shaped article of claim 11, wherein the shaped article is an aircraft interior part, a dishware or food processing component, a fiber of a woven or non-woven fabric, a thermoformable laminated sheet, or an additive manufactured article.

13. The polymer composition claim 1, wherein the melt flow rate of the polymer composition is at least 50% greater than the melt flow rate of the PEI alone, wherein the melt flow rate is measured at 400° C. with a 2.16 kg weight according to ASTM D1238.

* * * * *